United States Patent
Kang et al.

(10) Patent No.: US 8,441,952 B2
(45) Date of Patent: May 14, 2013

(54) DUAL-BAND WIRELESS COMMUNICATION APPARATUS AND METHOD FOR CHANNEL ALLOCATION USING THE SAME

(75) Inventors: Yong-jin Kang, Suwon-si (KR); Eung-sik Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 12/899,940

(22) Filed: Oct. 7, 2010

(65) Prior Publication Data
US 2011/0149768 A1    Jun. 23, 2011

(30) Foreign Application Priority Data

Dec. 18, 2009 (KR) .................. 10-2009-0127154

(51) Int. Cl.
*H04J 1/16* (2006.01)
*H04W 8/22* (2009.01)

(52) U.S. Cl.
USPC .......................................... 370/252; 370/329

(58) Field of Classification Search .................. 370/252, 370/329
See application file for complete search history.

(56) References Cited

U.S. PATENT DOCUMENTS

| | | | | |
|---|---|---|---|---|
| 5,960,351 A | * | 9/1999 | Przelomiec | 455/450 |
| 2001/0031015 A1 | * | 10/2001 | West et al. | 375/260 |
| 2008/0106476 A1 | * | 5/2008 | Tran et al. | 343/702 |
| 2009/0196180 A1 | | 8/2009 | Bahl et al. | |
| 2009/0258672 A1 | * | 10/2009 | Camp et al. | 455/553.1 |
| 2012/0093028 A9 | * | 4/2012 | Mese et al. | 370/254 |

FOREIGN PATENT DOCUMENTS

| | | |
|---|---|---|
| EP | 1 944 996 A2 | 7/2008 |
| WO | 2008/007861 A1 | 1/2008 |

OTHER PUBLICATIONS

European Search Report, dated Feb. 21, 2011, issued in Application No. 10190053.8.

* cited by examiner

*Primary Examiner* — Brian D Nguyen
(74) *Attorney, Agent, or Firm* — Sughrue Mion, PLLC

(57) ABSTRACT

A dual-band wireless communication apparatus and a channel allocation method thereof, the channel allocation method of a dual-band wireless communication apparatus including a plurality of wireless communicators includes: receiving wireless environment information via at least one of the wireless communicators; changing, at a wireless communicator not allocated a channel among the wireless communicators, a frequency band according to a received signal strength; and scanning, at the wireless communicator not allocated the channel, channels in the changed frequency band and setting one of the scanned channels to a channel for communicating with an external device. Thus, the dual-band wireless communication apparatus can offer various wireless application services by minimizing interference caused when a plurality of wireless terminals operates within one wireless communication apparatus.

21 Claims, 8 Drawing Sheets

DUAL-BAND WIRELESS COMMUNICATION APPARATUS AND METHOD FOR CHANNEL ALLOCATION USING THE SAME

CROSS-REFERENCE TO RELATED APPLICATION

This application claims priority from Korean Patent Application No. 10-2009-127154, filed Dec. 18, 2009 in the Korean Intellectual Property Office, the disclosure of which is incorporated herein by reference in its entirety.

BACKGROUND

1. Field

Apparatuses and methods consistent with the exemplary embodiments relate to a dual-band wireless communication apparatus and a channel allocation method using the same. More particularly, apparatuses and methods consistent with the exemplary embodiments relate to a dual-band wireless communication apparatus for communicating with an external wireless terminal using various frequency bands, and a channel allocation method thereof.

2. Description of the Related Art

As home networking and wireless communication technologies spread, wireless techniques applied to communication devices and PCs are spreading to home appliances. However, different wireless techniques are mixed and used in the home appliances. As the different wireless techniques are used all together in the home, function disorders are caused by frequency interference. In addition, as for an audio/video AV product requiring a high transmission bandwidth, the function disorder caused by the frequency interference is a considerable obstacle to the wireless technology diffusion for the home appliances.

For example, 2.4 GHz band for wireless LAN 802.11b or 802.11g is used by microwave ovens, plasma bulbs, Bluetooth devices, and wireless surveillance cameras. Naturally, when such a microwave oven is operated while using the wireless LAN 802.11b, the frequency interference results and the wireless LAN cannot work well.

Meanwhile, when a plurality of wireless technologies is embedded in one product or operated in a same space, a related art method avoids mutual interference by controlling a radio signal output time of the wireless systems not to overlap each other. In the related art wireless systems, the allowed frequency band is fixed to one frequency band. Even when two or more frequency bands are available, the product (or a user) cannot select and use the frequency band.

However, to synchronize the radio signal output time of two wireless systems, it is necessary to interconnect the two wireless systems by a communication line. In addition, the two wireless systems need to be physically close enough to connect the communication line, and a separate protocol is required to synchronize the radio signal output time.

Thus, when a plurality of wireless terminals is used via a single dual-band wireless communication apparatus, there is a need for a method of minimizing the frequency interference between the wireless terminals without synchronizing the radio signal output time.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

Exemplary embodiments provide a dual-band wireless communication apparatus for allocating channels to at least one of a plurality of wireless communicators according to wireless environment information received via at least one of the wireless communicators, setting, at a wireless communicator allocated the channel among the plurality of the wireless communicators, the allocated channel, and scanning, at a wireless communicator allocated no channel among the plurality of the wireless communicators, channels by changing a frequency band according to a received signal strength and a channel allocation method thereof.

According to an aspect of an exemplary embodiment, there is provided a channel allocation method of a dual-band wireless communication apparatus including a plurality of wireless communicators, the method including: receiving wireless environment information via at least one of the wireless communicators; allocating a channel to a first wireless communicator of the wireless communicators based on the received wireless environment information; setting, at the first wireless communicator, the allocated channel as a channel for communicating with an external device; changing, at a second wireless communicator not allocated a channel among the plurality of wireless communicators, a frequency band according to a received signal strength; and scanning, at the second wireless communicator, channels in the changed frequency band and setting one of the scanned channels as a channel for communicating with the external device.

The changing may include measuring, at the second wireless communicator, a received signal strength of a frequency band different from a current frequency band currently set; and when the measured received signal strength exceeds a threshold, changing the current frequency band to the different frequency band.

The channel allocation method may further include: receiving the changed frequency band and the scanned channels from the second wireless communicator; updating information on channels allocated to the plurality of wireless communicators according to the received frequency band and channel information; and transmitting the updated channel information to the plurality of wireless communicators.

The channel allocation method may further include: measuring a Packet Error Rate (PER) of the wireless communicators; and regulating a radio output until the measured PER reaches a PER defined for each wireless communicator.

The allocating may allocate the channels to maximize a center frequency interval between the channels of the plurality of wireless communicators.

The wireless environment information may include at least one of information indicating whether the corresponding wireless communicator supports multichannel, a center frequency, an occupied bandwidth, and a received signal strength of a radio channel.

The channel allocation method may further include limiting a radio output of an unused wireless communicator of the plurality of wireless communicators.

The dual-band wireless communication apparatus may use an Industrial Scientific Medical (ISM) band.

According to an aspect of another exemplary embodiment, there is provided a dual-band wireless communication apparatus including: a plurality of wireless communicators which respectively communicate with a plurality of external devices respectively; and a controller which receives wireless environment information via a first wireless communicator among the plurality of wireless communicators and allocating a channel to the first wireless communicator based on the received wireless environment information.

The first wireless communicator allocated the channel from the controller among the wireless communicators may communicate with an external device over the allocated channel, and a second wireless communicator not allocated the channel from the controller among the plurality of wireless communicators may change a frequency band according to a received signal strength, scan channels in the changed frequency band, and communicate with the external device over one of the scanned channels.

The second wireless communicator may measure a received signal strength of a frequency band different from a current frequency band currently set and change the current frequency band to the different frequency band when the measured received signal strength exceeds a threshold.

The controller may receive the changed frequency band and the scanned channels from the second wireless communicator not allocated the channel, update information of channels allocated to the plurality of wireless communicators according to the received frequency band and channel information, and transmit the updated channel information to the wireless communicators.

The first or second wireless communicator may measure a PER and regulate a radio output until the measured PER reaches a particular PER.

The controller may allocate the channels to maximize a center frequency interval between channels of the plurality of wireless communicators.

The wireless environment information may include at least one of information indicating whether the corresponding wireless communicator supports multichannel, a center frequency, an occupied bandwidth, and a received signal strength of a radio channel.

The controller may limit a radio output of an unused wireless communicator of the plurality of wireless communicators.

The dual-band wireless communication apparatus may use an Industrial Scientific Medical (ISM) band.

According to an aspect of another exemplary embodiment, there is provided a channel allocation method of a wireless communicator of a dual-band wireless communication apparatus which comprises a plurality of wireless communicators, the method including: determining if a channel is allocated to the wireless communicator by a controller of the wireless communication apparatus; if the channel is allocated, setting the allocated channel as the channel of the wireless communicator for communicating with an external device; and if the channel is not allocated, changing, at the wireless communicator, a frequency band according to a received signal strength, scanning channels in the changed frequency band, and setting one of the scanned channels as the channel of the wireless communicator for communicating with the external device.

BRIEF DESCRIPTION OF THE DRAWINGS

The above and/or other aspects will become more apparent by describing certain exemplary embodiments with reference to the accompanying drawings, in which.

DETAILED DESCRIPTION OF EXEMPLARY EMBODIMENTS

Exemplary embodiments will now be described in greater detail below with reference to the accompanying drawings. In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the exemplary embodiments with unnecessary detail. Expressions such as "at least one of," when preceding a list of elements, modify the entire list of elements and do not modify the individual elements of the list.

Figure 1:
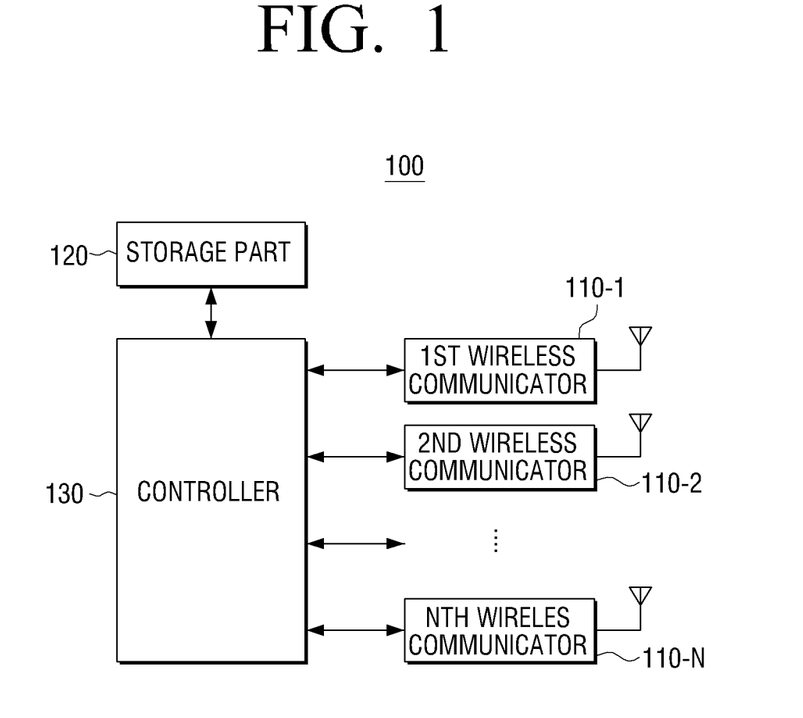
FIG. 1 is a block diagram of a dual-band wireless communication apparatus according to an exemplary embodiment.

FIG. 1 is a block diagram of a dual-band wireless communication apparatus according to an exemplary embodiment. Referring to FIG. 1, the dual-band wireless communication apparatus 100 includes a plurality of wireless communicators 110-1 through 110-N, a storage part 120, and a controller 130. The dual-band wireless communication apparatus 100 wirelessly communicates with an external device using, for example, Industrial Scientific Medical (ISM) band. The ISM band is 2.4 GHz band or 5.7 GHz band of low power frequency bands 902 MHz~928 MHz, 2.4 GHz~2.4835 GHz, and 5.725 GHz~5.825 GHz available for unlicensed users.

Figure 2:
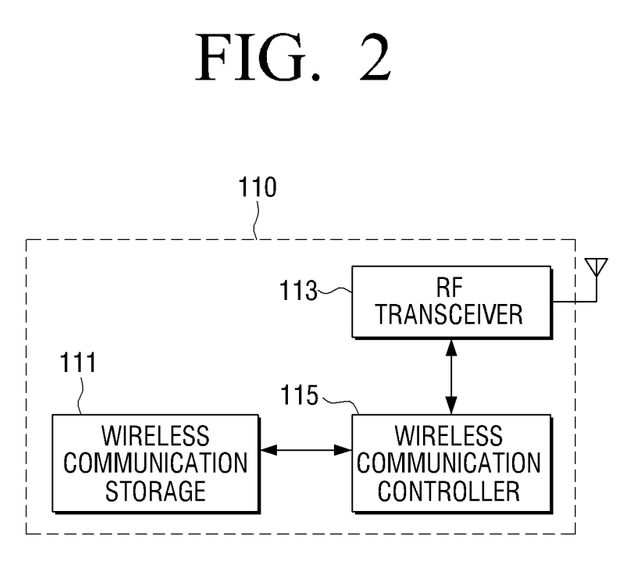
FIG. 2 is a block diagram of a wireless communicator according to an exemplary embodiment.

The wireless communicators 110-1 through 110-N will now be described with reference to FIG. 2. FIG. 2 is a block diagram of a wireless communicator 110 according to an exemplary embodiment. Referring to FIG. 2, the wireless communicator 110 includes a Radio Frequency (RF) transceiver 111, a wireless communication storage 113, and a wireless communication controller 115.

The RF transceiver 111 communicates with an external terminal using radio channel signals of a particular frequency band. In more detail, the RF transceiver 111 transmits a control command of the external terminal fed from the controller 130, to the external terminal. The RF transceiver 111 sends a command of the external terminal to forward to the controller 130.

The wireless communication storage 113 stores information relating to a wireless communication environment (herinafter, referred to as wireless environment information). The wireless environment information may include information on whether the wireless communicator supports 110 a multichannel, a center frequency, an occupied bandwidth, and a received signal strength.

The wireless communication controller 115 sends the wireless environment information to the controller 130. Based on channel allocation information received from the controller 130, the wireless communication controller 115 sets the frequency band and the channel of the wireless communicator 110 and controls an output thereof. Herein, the channel allocation information specifies that the controller 130 allocates the channels to be used by the wireless communicators 110-1 through 110-N based on the received wireless environment information.

More specifically, the wireless communication controller 115 sends the information relating to the wireless communication environment stored in the wireless communication storage 113 to the controller 130. When the controller 130 allocates the channel to at least one of the wireless communicators 110-1 through 110-N based on the transmitted wireless communication environment, the wireless communication controller 115 receives the channel allocation information of the wireless communicators 110-1 through 110-N from the controller 130. The wireless communication controller 115 controls the wireless communication storage 113 to store the channel allocation information of the wireless communicators 110-1 through 110-N. The wireless communication controller 115, when detecting the channel allocated to its wireless communicator 110, controls the RF transceiver 111 to communicate with an external device over the allocated channel.

When there is no channel allocated to the wireless communicator 110, the wireless communication controller 115 measures a received signal strength of a frequency band different from a current frequency band. For example, when the current frequency band is 2.4 GHz band, the wireless communication controller 115 measures a received signal strength in the frequency band of 5.7 GHz band. Herein, the current frequency band indicates the frequency band currently defined in the wireless communicator 110, and the received signal strength can use a Received Signal Strength Indication (RSSI).

When the measurement of the received signal strength of the different frequency band exceeds a threshold, the wireless communication controller 115 changes to the frequency band which exceeds the threshold. For example, when the current frequency band is 2.4 GHz band and the received signal strength of the 5.7 GHz frequency band exceeds the threshold over a certain time duration, the wireless communication controller 115 changes the frequency band for communicating with the external device from 2.4 GHz band to 5.7 GHz band.

By contrast, when the measurement of the received signal strength of the different frequency band does not exceed the threshold, the wireless communication controller 115 measures the received signal strength in another different frequency band and determines whether the measurement exceeds the threshold. By repeating this process, the wireless communication controller 115 sets the frequency band of the best received signal strength.

Next, the wireless communication controller 115 scans channels to communicate with the external device within the changed frequency band. Among the scanned channels, the wireless communication controller 115 sets the channel of the greatest center frequency interval from the center frequency of the channels used by the other wireless communicators. When the interval between the center frequencies of the channels used by two wireless communicators is greatest, the frequency interference is minimized.

Figure 8:
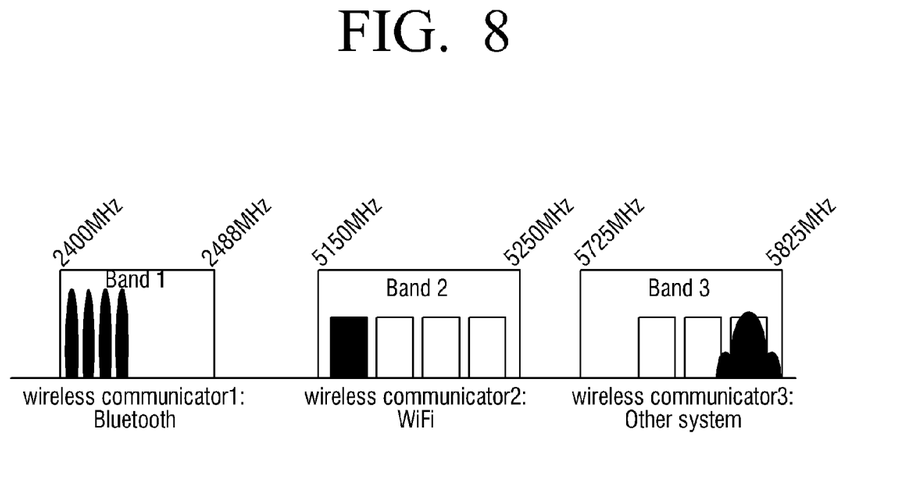
FIG. 8 is a diagram of a channel allocation for minimizing interference according to an exemplary embodiment.

For example, as shown in FIG. 8, the first wireless communicator 110-1 uses one of channels in 2.4 GHz band which is the Bluetooth band, and the second wireless communicator 110-2 uses 5.2 GHz band which is the WiFi band. The third wireless communicator 110-3 is designated to the 5.7 GHz frequency band. In the channels of the 5.7 GHz band, the third wireless communicator 110-3 defines the channel with the center frequency having the greatest interval from the center frequency of the channels used by the first wireless communicator 110-1 and the second wireless communicator 110-2. That is, the third wireless communicator 110-3 sets the channel close to 5.825 GHz as the channel for communicating with the external device. As such, the third wireless communicator 110-3 can set the channel to minimize interference with the first wireless communicator 110-1 and the second wireless communicator 110-2.

The wireless communication controller 115 controls the wireless communication storage 113 to store the changed frequency band and the scanned channel information and sends the changed frequency band and the scanned channel information to the controller 130. The wireless communication controller 115 receives updated channel allocation information from the controller 130. The updated channel allocation information includes the changed frequency band and the scanned channel information of at least one of the wireless communicators 110-1 through 110-N.

As stated above, when the wireless communication controller 115 allocates the channels of the wireless communicator 110, it is possible not only to automatically set the frequency band and the channel, but also to minimize interference between the wireless communicators 110-1 through 110-N.

The wireless communication controller 115 measures a Packet Error Rate (PER) of the received packet. Furthermore, the wireless communication controller 115 regulates the radio output until the measured PER reaches a particular PER. By controlling the radio output, the wireless communication controller 115 minimizes interference between the wireless communicators 110-1 through 110-N.

Referring back to FIG. 1, the storage part 120 stores the wireless environment information transmitted from at least one of the wireless communicators 110-1 through 110-N. Herein, the wireless environment information includes information on whether the wireless communicator supports a multichannel, a center frequency, an occupied bandwidth, and a received signal strength.

The controller 130 receives the wireless environment information via at least one of the wireless communicators 110-1 through 110-N. According to the received wireless environment information, the controller 130 allocates the channels to at least one of the wireless communicators 110-1 through 110-N. As an example, the controller 130 allocates the channel to the wireless communicator which sends the wireless environment information, but allocates no channel to the wireless communicator which does not send the wireless environment information. The controller 130 allocates the channels to maximize the interval between the center frequencies of the channels, in order to minimize interference occurring when the wireless communicators 110-1 through 110-N conduct wireless communication at the same time.

Among the wireless communicators 110-1 through 110-N, when the wireless communicator which is not allocated the channel transmits a changed frequency band and scanned channels to the controller 130, the controller 130 updates the channel allocation information and transmits the updated channel allocation information to the wireless communicators 110-1 through 110-N. The updated channel allocation information includes the changed frequency band and the scanned channel information of the wireless communicator not allocated the channel.

Moreover, the controller 130 controls to limit the radio output of an unused wireless communicator among the wireless communicators 110-1 through 110-N. As a result, interference is minimized between the wireless communicators 110-1 through 110-N by limiting unnecessary radio output.

A channel allocation method of a dual-band wireless communication apparatus according to an exemplary embodiment will now be described with reference to FIGS. 3 and 4.

Figure 3:
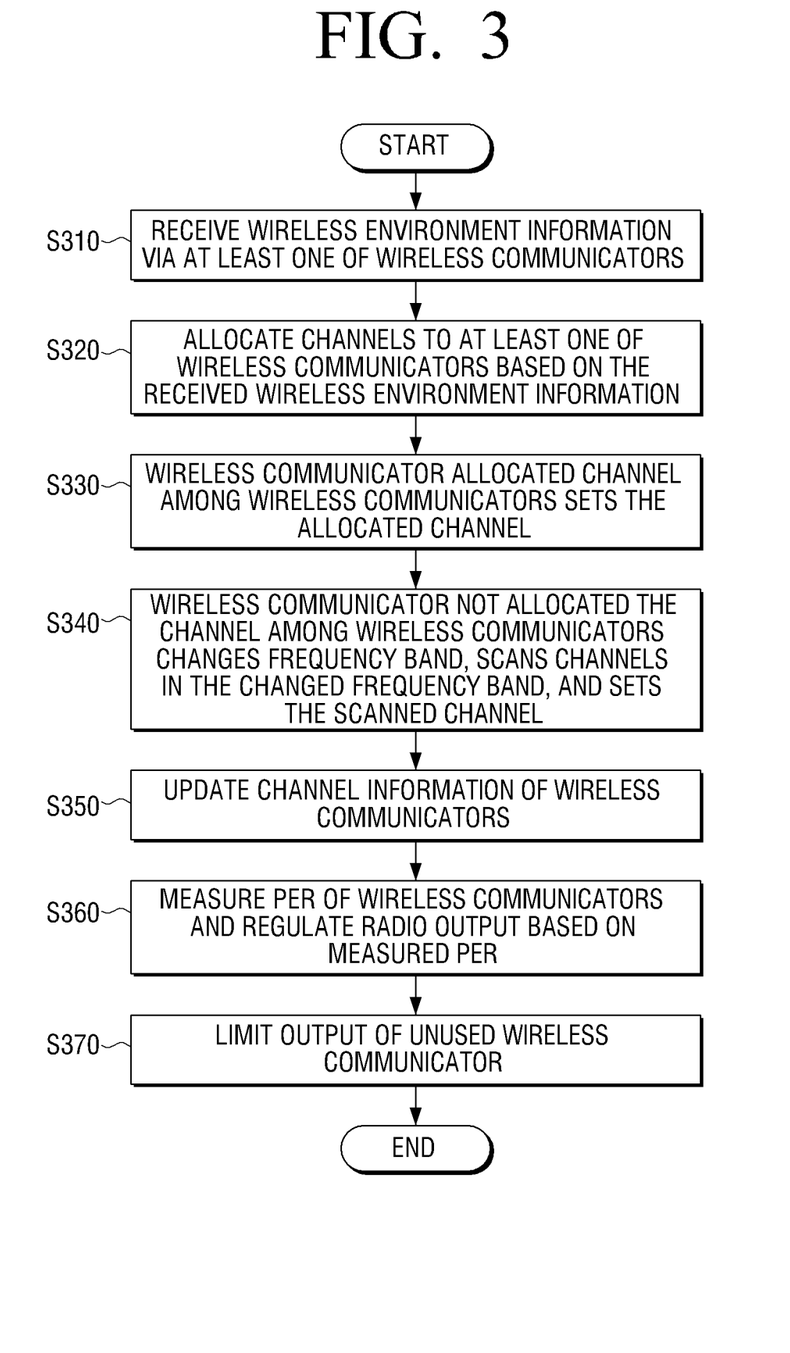
FIG. 3 is a flowchart of a channel allocation method of a dual-band wireless communication apparatus according to an exemplary embodiment.

FIG. 3 is a flowchart of a channel allocation method of a dual-band wireless communication apparatus according to an exemplary embodiment.

Referring to FIG. 3, the dual-band wireless communication apparatus (herineafter, referred to as a wireless apparatus) 100 receives the wireless environment information via at least one of the wireless communicators 110-1 through 110-N (S310). The wireless environment information includes, for example, the information on whether the wireless communicator 110 supports the multichannel, the center frequency, the occupied bandwidth, and the received signal strength.

The wireless apparatus 100 allocates a channel to at least one of the wireless communicators 110-1 through 110-N based on the received wireless environment information (S320). For example, the wireless communicator 110, which transmits the wireless environment information, is allocated the channel based on the wireless environment information. Meanwhile, the wireless communicator 110 not transmitting the wireless environment information is not allocated the channel. Hence, channels may be allocated to some of the wireless communicators 110-1 through 110-N, rather than allocating a channel to every wireless communicator 110-1 through 110-N.

The wireless apparatus 100 allocates the channel to maximize the interval between the center frequencies of the allocated channels. This is to minimize interference in the wireless communication via the wireless communicators 110-1 through 110-N.

After allocating the channels, the wireless apparatus 100 transmits the channel allocation information of the wireless communicators 110-1 through 110-N to all of the wireless communicators 110-1 through 110-N.

The wireless communicator allocated the channel among the wireless communicators 110-1 through 110-N, sets the allocated channel as the channel for communicating with the external device (S330) and communicates with the external device over the allocated channel.

The wireless communicator not allocated the channel among the wireless communicators 110-1 through 110-N, changes its frequency band. Furthermore, the wireless communicator scans channels in the changed frequency band and sets the scanned channel as the channel for communicating with the external device (S340).

Specifically, the wireless communicator not allocated the channel measures the received signal strength of the frequency band different from the current frequency band. When the measured received signal strength of the different frequency band exceeds a threshold, the wireless communicator alters the frequency band to the different frequency band exceeding the threshold. Furthermore, the wireless communicator scans channels in the altered frequency band and sets the channel for communicating with the external device from the scanned channels to minimize interference.

For example, when the current frequency band is 2.4 GHz band, the wireless communicator 110 measures the received signal strength in the frequency band of 5.7 GHz band. When the received signal strength of the 5.7 GHz frequency band exceeds the threshold over a certain time duration, the wireless communicator 110 changes the frequency band for communicating with the external device from 2.4 GHz band to 5.7 GHz band. Furthermore, the wireless communicator 110 scans channels in the 5.7 GHz band changed. To minimize interference with the other wireless communicators, the wireless communicator 110 sets the channel which maximizes the center frequency interval from the other wireless communicators, among the scanned channels.

When the wireless communicator not allocated the channel sets the channel by changing the frequency band, the wireless apparatus 100 updates the channel information of the wireless communicators 110 (S350). In more detail, the wireless apparatus 100 updates the channel allocation information including the changed frequency band and the set channel information of the wireless communicator 110 not allocated the channel. Then, the wireless apparatus 100 stores and transmits the updated information to the wireless communicators 110-1 through 110-N.

Next, the wireless communicator 110 measures the PER and regulates the radio output according to the measured PER (S360). In further detail, the wireless communicator 110 regulates the radio output until the measured PER reaches a PER defined based on the service of the wireless communicator. Thus, the interference exerted on the other wireless systems can be minimized.

The wireless apparatus 100 limits the output of the wireless communication with respect to an unused wireless communicator of the wireless communicators 110-1 through 110-N (S370). The radio output of the unused wireless communicator is limited so as to minimize the interference with the other wireless communicators.

Figure 4:
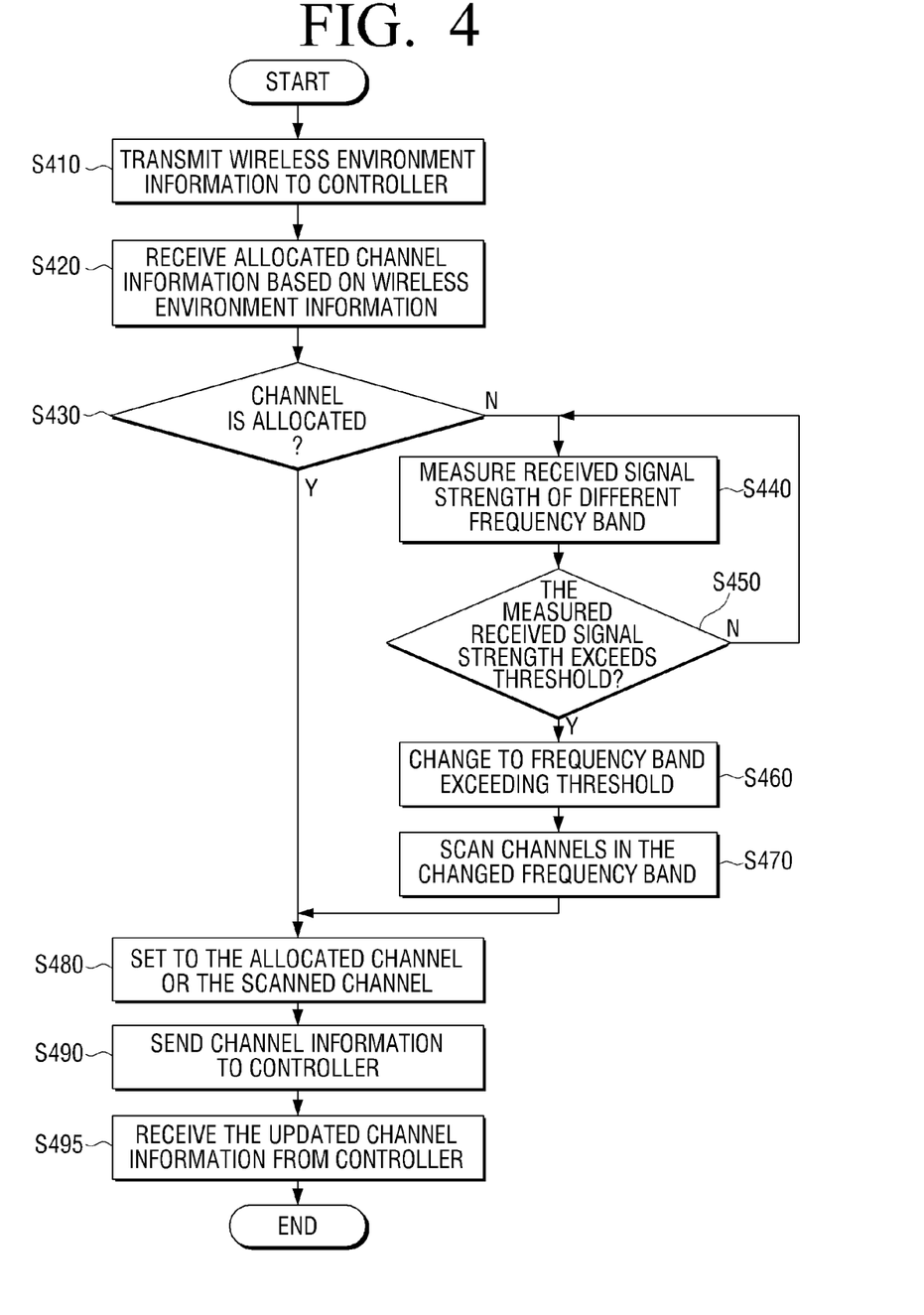
FIG. 4 is a flowchart of a channel allocation method of a wireless communicator according to an exemplary embodiment.

FIG. 4 is a flowchart of a channel allocation method of a wireless communicator according to an exemplary embodiment. Referring to FIG. 4, the wireless communicator 110 transmits the wireless environment information to the controller 130 (S410). The wireless environment information includes the information of whether the wireless communicator 110 supports the multichannel, the center frequency, the occupied bandwidth, and the received signal strength. The wireless communicator 110 having no wireless environment information may transmit information indicative of no wireless environment information to the controller 130.

The wireless communicator 110 receives the channel information allocated by the controller 110 according to the wireless environment information (S420). For example, the wireless communicator 110 transmitting the wireless environment information is allocated the channel based on the wireless environment information. In contrast, the wireless communicator 110 transmitting the information indicative of no wireless environment information is not allocated the channel.

Accordingly, the wireless communicator 110 determines whether the channel is allocated (S430). When the channel is allocated, the wireless communicator 110 sets the allocated channel as its channel for communicating with the external device (S480).

When no channel is allocated (S430-N), the wireless communicator 110 measures the received signal strength of the frequency band different from the current frequency band of the wireless communicator 110 (S440). When the measured received signal strength exceeds the threshold (S450-Y), the wireless communicator 110 changes the frequency band to the different frequency band exceeding the threshold (S460). The wireless communicator 110 scans channels in the changed frequency band (S470) and sets the channel to communicate with the external device (S480). The channel selected from the scanned channels has the maximum interval from the center frequency of the allocated channels of the other wireless communicators, so as to minimize interference with the other wireless communicators.

When the measured received signal strength does not exceed the threshold (S450-N), the wireless communicator 110 measures the received signal strength of a different frequency band (S440). By repeating S440 and S450, the wireless communicator 110 changes to the frequency band with the best received signal strength.

When the allocated channel or the scanned channel is set to the channel for communicating with the external device, the wireless communicator 110 transmits the set channel information to the controller 130 (S490). The set channel information includes information relating to the changed frequency band and the set channel.

When the controller 130 updates the allocated channel information, the wireless communicator 110 receives the updated channel information from the controller 130 (S495). Thus, the wireless communicator 110 may be able to reset the channel based on the updated channel information to minimize interference.

A channel allocation method of a wireless apparatus 100 will now be explained in case of a channel allocation and in case of no channel allocation with reference to FIGS. 5 and 6, respectively.

Figure 5:
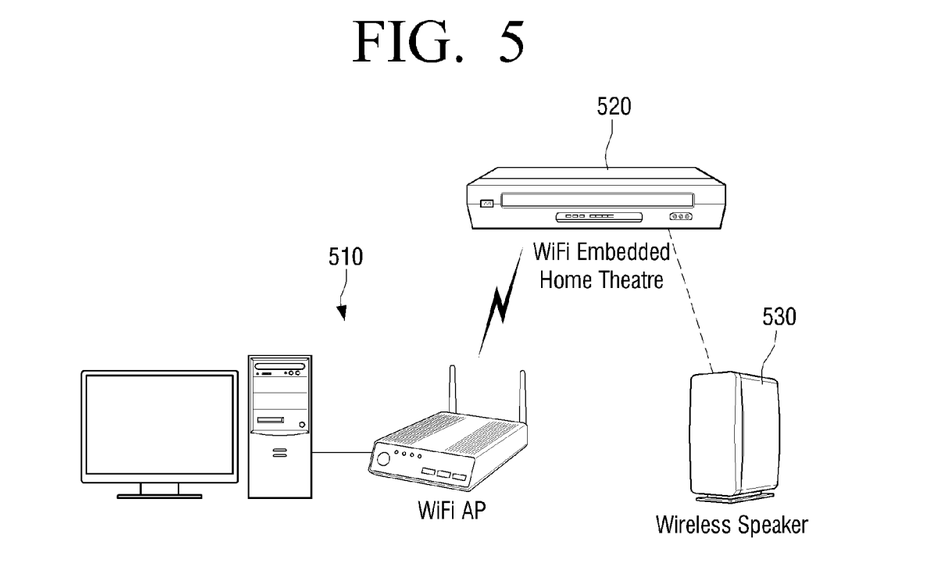
FIG. 5 is a diagram of a channel allocation when a wireless communicator is assigned a channel according to an exemplary embodiment.

FIG. 5 depicts a channel allocation of a WiFi embedded home theater 520 (hereinafter, referred to as a home theater), which corresponds to the wireless apparatus 100 illustrated in FIG. 1, when the wireless communicator 110 is assigned a channel according to an exemplary embodiment.

Referring to FIG. 5, the wireless communication system includes a WiFi access point (AP) 510 connected to a computer, the home theater 520, and a wireless speaker 530.

The WiFi AP 510 transmits the wireless environment information to the wireless communicator 110 of the home theater 520.

The wireless communicator 110 in the home theater 520 sends wireless environment information to the controller 130 of the home theater 520. Based on the received wireless environment information, the controller 130 of the home theater 520 allocates the channel of the wireless communicator to communicate with the wireless speaker 530. Herein, the controller 130 of the home theater 520 allocates one of the channels in, for example, 5.15 GHz~5.25 GHz which is the WiFi band. To avoid interference with the WiFi AP 510, the controller 130 of the home theater 520 allocates a channel of having a greatest interval from the center frequency of the communication channel of the WiFi AP 510.

When the controller 130 of the home theater 520 allocates the communication channel for the wireless speaker 530 to the wireless communicator, the wireless communicator 110 of the home theater 520 communicates with the wireless speaker 530 over the allocated channel.

Figure 6:
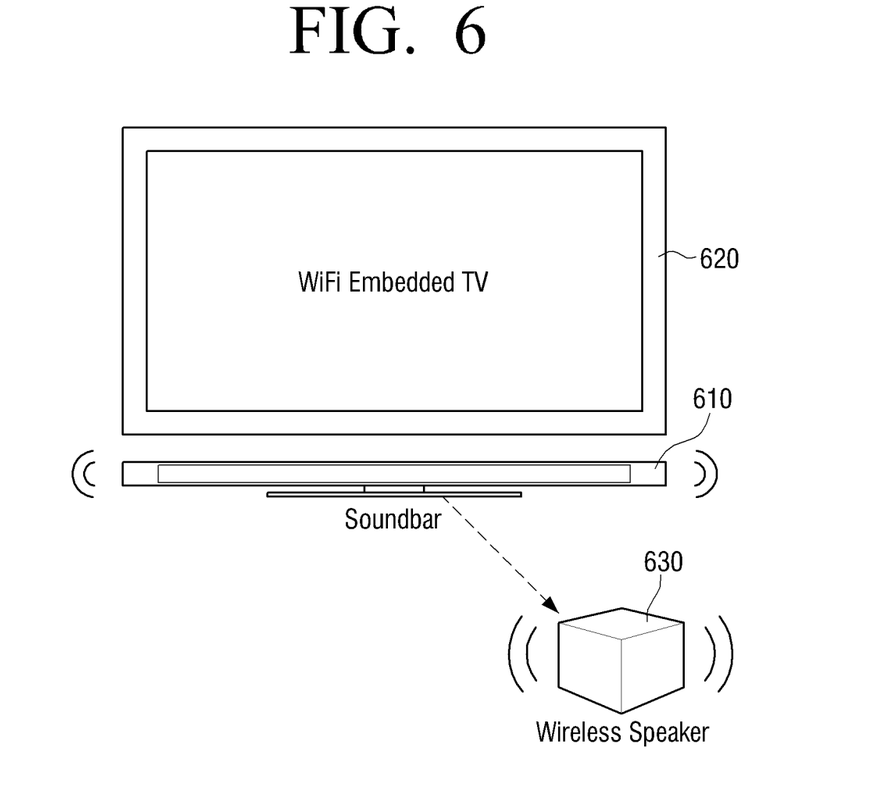
FIG. 6 is a diagram of a channel allocation when a wireless communicator is assigned no channel according to an exemplary embodiment.

FIG. 6 depicts a channel allocation of a soundbar 610, which corresponds to the wireless apparatus 100 illustrated in FIG. 1, when the wireless communicator 110 is assigned no channel for communicating with a wireless speaker 630 according to an exemplary embodiment. Referring to FIG. 6, the wireless communication system includes the soundbar 610, a WiFi embedded TV (hereinafter, referred to as a TV) 620, and the wireless speaker 630.

The wireless communicator 110 to communicate with the TV 620 among the wireless communicators 110 of the soundbar 610 has no wireless environment information relating to the WiFi, and thus sends information indicative of no wireless environment information to the controller 130 of the soundbar 610.

The wireless communicator 110 to communicate with the wireless speaker 630 among the wireless communicators 110 of the soundbar 610 has no wireless environment information relating to the wireless speaker 630, and thus sends information indicative of no wireless environment information to the controller 130 of the soundbar 610.

The wireless communicators 110 to communicate with the TV 620 and the wireless speaker 630, respectively, have no wireless environment information. At this time, when the controller 130 of the soundbar 610 arbitrarily allocates channels, interference can occur. Thus, the wireless communicator 110 according to an exemplary embodiment changes a frequency band as follows.

The controller 130 of the soundbar 610 sends the information indicative of no channel allocated to the wireless communicator 110 to communicate with the TV 620 and the information indicative of no channel allocated to the wireless communicator 110 to communicate with the wireless speaker 630, to the wireless communicator 110 which is to communicate with the wireless speaker 630.

Figure 7:
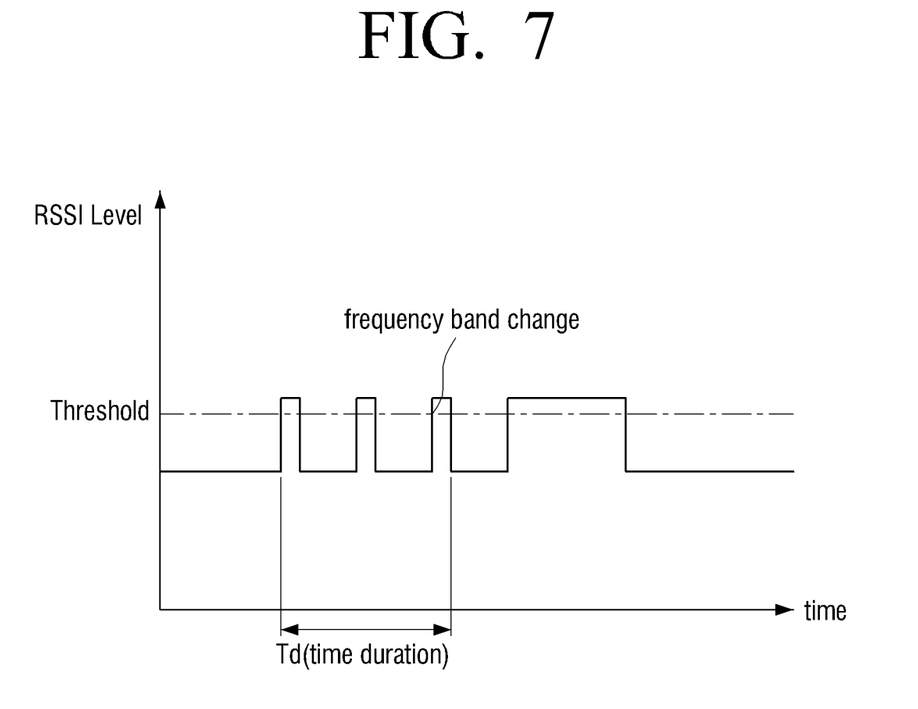
FIG. 7 is a graph of frequency band change using a received signal strength according to an exemplary embodiment.

The wireless communicator 110 receiving the information indicative of no channel allocated to itself measures a received signal strength of a frequency band different from a current frequency band. As shown in FIG. 7, when the received signal strength of the different frequency band exceeds the threshold over a certain time duration td, the wireless communicator 110 to communicate with the wireless speaker 630 changes the frequency band to the different frequency band. Next, the wireless communicator 110 to communicate with the wireless speaker 630 scans channels in the changed frequency band. Herein, to avoid interference with the radio communication of the TV 620, the wireless communicator 110 to communicate with the wireless speaker 630 sets the channel having a maximum interval from a center frequency of the communication channel of the TV 620, among the scanned channels. Thus, interference with the radio communication of the TV 620 can be minimized. Over the set channel, the soundbar 610 wirelessly communicates with the wireless speaker 630.

While the dual-band wireless communication apparatus 100 is described as the home theater and the soundbar in the above exemplary embodiments, the wireless apparatus 100 according to other exemplary embodiments can be implemented using any dual-band wireless communication apparatus capable of wirelessly communicating with several external devices concurrently.

As set forth above, a dual-band wireless communication apparatus allocates channels to minimize interference. Therefore, various wireless application services can be provided by minimizing interference caused when a plurality of wireless terminals operates within one wireless communication apparatus.

While not restricted thereto, the exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, the exemplary embodiments may be written as computer programs transmitted over a computer-readable transmission medium, such as a carrier wave, and received and implemented in general-use digital computers that execute the programs. Moreover, while not required in all aspects, one or more units of the image processing apparatus 200 or 300 can include a processor or microprocessor executing a computer program stored in a computer-readable medium, such as the local storage 220.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A channel allocation method of a multi-band wireless communication apparatus which comprises a plurality of wireless communicators, the method comprising:
   receiving, by a controller of the multi-band wireless communication apparatus, wireless environment information via at least one of the plurality of wireless communicators;
   allocating, by the controller, a channel to a first wireless communicator, among the plurality of wireless communicators, based on the received wireless environment information;
   setting, at the first wireless communicator, the allocated channel as a channel for communicating with a first external device;
   changing, at a second wireless communicator not allocated, by the controller, a channel among the plurality of wireless communicators, a frequency band according to a received signal strength; and
   scanning, at the second wireless communicator, channels in the changed frequency band and setting one of the scanned channels as a channel for communicating with a second external device.

2. The channel allocation method of claim 1, wherein the changing the frequency band comprises:
   measuring, at the second wireless communicator, a received signal strength of a frequency band different from a current frequency band currently set in the second wireless communicator; and
   in response to the measured received signal strength exceeding a threshold, changing the current frequency band to the different frequency band.

3. The channel allocation method of claim 1, further comprising:
   receiving the changed frequency band and the scanned channels from the second wireless communicator;
   updating information on channels allocated to the plurality of wireless communicators according to the received frequency band and channel information; and
   transmitting the updated channel information to the plurality of wireless communicators.

4. The channel allocation method of claim 1, further comprising:
   measuring a Packet Error Rate (PER) of the plurality of wireless communicators; and
   regulating a radio output until the measured PER reaches a PER defined for each of the plurality of wireless communicators.

5. The channel allocation method of claim 1, wherein the allocating comprises allocating the channel to maximize a center frequency interval between channels of the plurality of wireless communicators.

6. The channel allocation method of claim 1, wherein the wireless environment information comprises at least one of information indicating whether the corresponding wireless communicator supports multichannel, a center frequency, an occupied bandwidth, and a received signal strength of a radio channel.

7. The channel allocation method of claim 1, further comprising:
   limiting a radio output of an unused wireless communicator among the plurality of wireless communicators.

8. The channel allocation method of claim 1, wherein the multi-band wireless communication apparatus uses an Industrial Scientific Medical (ISM) band.

9. The channel allocation method of claim 1, wherein the receiving the wireless environment information comprises receiving the wireless environment information via the first wireless communicator.

10. A non-transitory computer readable recording medium having recorded thereon a program executable by a computer for performing the method of claim 1.

11. A multi-band wireless communication apparatus comprising:
   a plurality of wireless communicators which respectively communicate with a plurality of external devices; and
   a controller which receives wireless environment information via at least one of the wireless communicators and which allocates a channel to a first wireless communicator, among the plurality of wireless communicators, based on the received wireless environment information,
   wherein the first wireless communicator communicates with a first external device over the allocated channel, and
   a second wireless communicator not allocated the channel from the controller among the plurality of wireless communicators changes a frequency band according to a received signal strength, scans channels in the changed frequency band, and communicates with a second external device over one of the scanned channels.

12. The multi-band wireless communication apparatus of claim 11, wherein the second wireless communicator measures a received signal strength of a frequency band different from a current frequency band currently set in the second wireless communicator and changes the current frequency band to the different frequency band when the measured received signal strength exceeds a threshold.

13. The multi-band wireless communication apparatus of claim 11, wherein the controller receives the changed frequency band and the scanned channels from the second wireless communicator, updates information on channels allocated to the plurality of wireless communicators according to the received frequency band and channel information, and transmits the updated channel information to the plurality of wireless communicators.

14. The multi-band wireless communication apparatus of claim 11, wherein the first wireless communicator measures a Packet Error Rate (PER) and regulates a radio output until the measured PER reaches a particular PER.

15. The multi-band wireless communication apparatus of claim 11, wherein the controller allocates the channel to maximize a center frequency interval between channels of the plurality of wireless communicators.

16. The multi-band wireless communication apparatus of claim 11, wherein the wireless environment information comprises at least one of information indicating whether the corresponding wireless communicator supports multichannel, a center frequency, an occupied bandwidth, and a received signal strength of a radio channel.

17. The multi-band wireless communication apparatus of claim 11, wherein the controller limits a radio output of an unused wireless communicator among the plurality of wireless communicators.

18. The multi-band wireless communication apparatus of claim 11, wherein the multi-band wireless communication apparatus uses an Industrial Scientific Medical (ISM) band.

19. A channel allocation method of a wireless communicator of a multi-band wireless communication apparatus which comprises a plurality of wireless communicators, the method comprising:
 determining if a channel is allocated to the wireless communicator by a controller of the wireless communication apparatus;
 if the channel is allocated, setting the allocated channel as the channel of the wireless communicator for communicating with an external device; and
 if the channel is not allocated, changing, at the wireless communicator, a frequency band according to a received signal strength, scanning channels in the changed frequency band, and setting one of the scanned channels as the channel of the wireless communicator for communicating with the external device.

20. The channel allocation method of claim 19, further comprising:
 transmitting, from the wireless communicator, wireless environment information to the controller,
 wherein the determining if the channel is allocated comprises:
  receiving, from the controller, allocated channel information based on the transmitted wireless environment information, and
  determining if the channel is allocated to the wireless communicator based on the received allocated channel information.

21. A non-transitory computer readable recording medium having recorded thereon a program executable by a computer for performing the method of claim 19.

* * * * *